June 9, 1925.
E. T. WINGET ET AL
SIGNAL FOR MOTOR VEHICLES
Filed Dec. 22, 1921
1,541,089
2 Sheets-Sheet 1
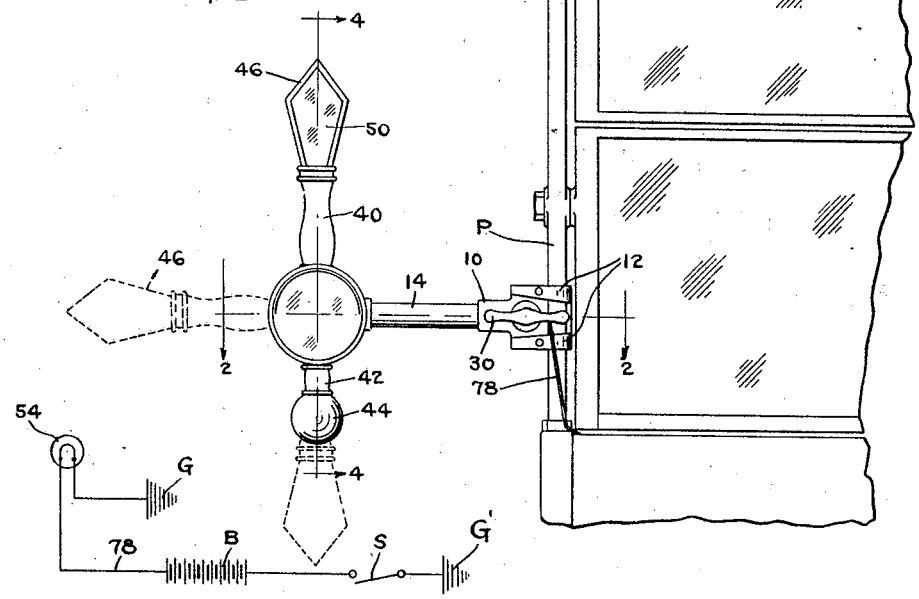
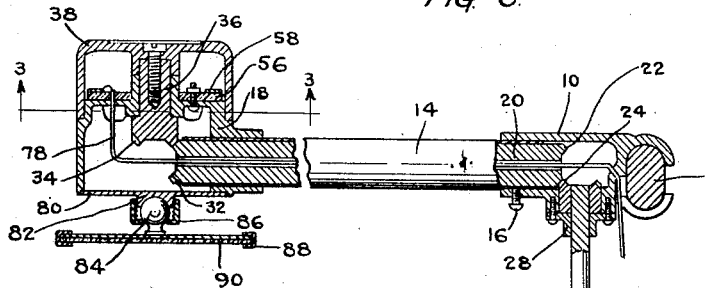
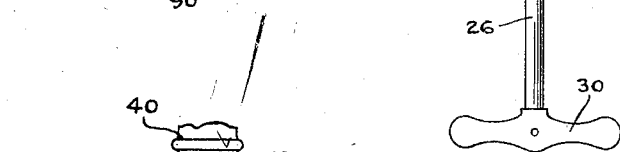
INVENTORS:
EARL T. WINGET.
HARVEY E. BRADLEY.
MORLEY C. WALTER.
BY Whiteley and Ruckman
ATTORNEYS.

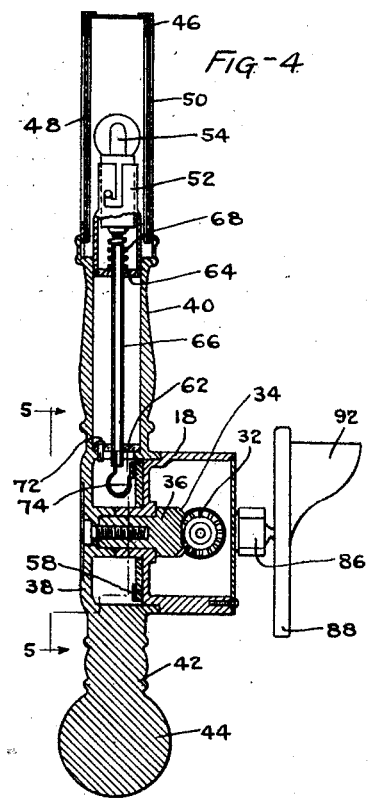
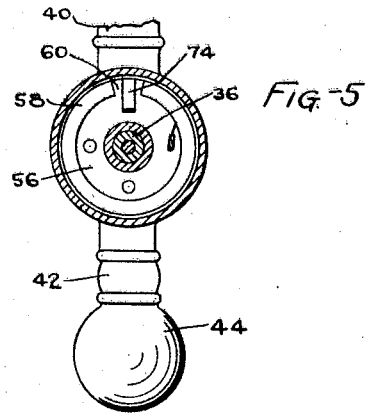
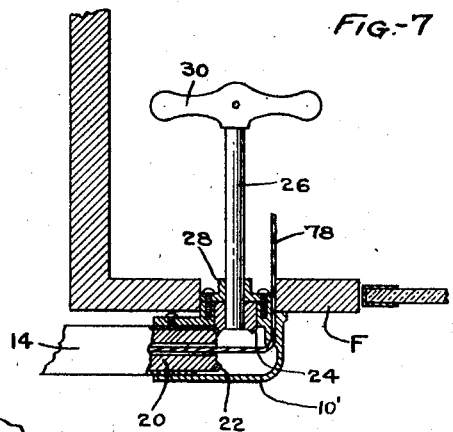
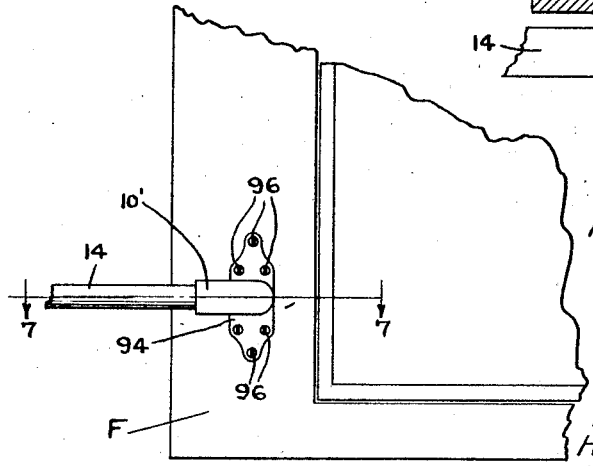

Patented June 9, 1925.

1,541,089

UNITED STATES PATENT OFFICE.

EARL T. WINGET, HARVEY E. BRADLEY, AND MORLEY C. WALTER, OF MINNEAPOLIS, MINNESOTA, ASSIGNORS TO H. E. BRADLEY CO., OF MINNEAPOLIS, MINNESOTA.

SIGNAL FOR MOTOR VEHICLES.

Application filed December 22, 1921. Serial No. 524,100.

*To all whom it may concern:*

Be it known that we, EARL T. WINGET, HARVEY E. BRADLEY, and MORLEY C. WALTER, citizens of the United States, residing at Minneapolis, in the county of Hennepin and State of Minnesota, have invented certain new and useful Improvements in Signals for Motor Vehicles, of which the following is a specification.

Our invention relates to signals for motor vehicles, and an object is to provide a device by means of which the driver may readily indicate the manner in which he intends to drive the vehicle. Another object is to provide a device which will give signals of different character according to whether the observer is at the front or at the rear of the vehicle.

The full objects and advantages of our invention will appear in connection with the detailed description, and the novel features embodied in our inventive idea will be particularly pointed out in the claim.

In the accompanying drawings which illustrate the application of our invention in two slightly different forms, Fig. 1 is a rear elevational view of our device secured to a windshield post of an open-type of motor vehicle. Fig. 2 is a view in horizontal section on the line 2—2 of Fig. 1. Fig. 3 is a view in section on the line 3—3 of Fig. 2. Fig. 4 is a view in vertical section on the line 4—4 of Fig. 1. Fig. 5 is a view in section on the line 5—5 of Fig. 4. Fig. 6 is an elevational view of a slight modification showing how the device may be attached to a closed car. Fig. 7 is a view in horizontal section on the line 7—7 of Fig. 6. Fig. 8 is a view showing a wiring diagram.

As shown in the drawings, and referring first in particular to the construction shown in Figs. 1 to 5, a support 10 is secured by clips 12 to a wind shield post P. The support 10 is hollow and receives the inner end of a laterally extending sleeve 14 which as shown in Fig. 2 is held in the support by a set screw 16. Rigidly secured to the outer end of the sleeve 14 is a cup-shaped member 18. Rotatably mounted in the sleeve 14 is a hollow shaft 20 on the inner end of which is a miter gear 22 which meshes with a miter gear 24 secured on the inner end of a shaft 26 which is held rotatably in the support 10 by a plate 28. Secured to the outer end of the shaft 26 is a handle 30 located within easy reach of the driver. On the outer end of the shaft 20 and located within the cup member 18 is a miter gear 32 which meshes with a miter gear 34 on a shaft 36 rotatably mounted in a bearing carried by the face of the cup member. Secured to the outer end of the shaft 36 is a second cup-shaped member 38, the periphery of which rotatably engages at one side of the periphery of the cup member 18. Secured to and extending from one side of the cup member 38 is a hollow arm 40 while secured to and extending from the other side of this cup member is an arm 42 which terminates in a knob 44. Secured to the outer end of the arm 40 is a casing 46, the front and rear portions 48 and 50 of which consist of translucent plates which may be of any desired different colors, but preferably red at the rear. Within the casing 46 is a socket 52 which holds an electric bulb 54 positioned between the translucent plates. Secured to the outer face of the cup member 18 is a ring 56 of insulating material upon which is mounted a contact ring 58 having a gap 60 in its periphery at the upper side thereof. Within the hollow arm and supported by insulating disks 62 and 64 is a conducting rod 66. Surrounding the upper end of this rod above the disk 64 is a spring 68 which has the double function of forming a connection with one terminal of the lamp filament and of holding the lamp bulb in its socket as will be evident from Fig. 4. The other terminal of the lamp filament is connected to the metal of the lamp socket which in turn connects with the metal framework so that the connection from this end of the filament is grounded as indicated at G in Fig. 8. The insulating disk 62 is provided with a pin 72 which engages a lug on the interior surface of the arm 40 so as to prevent the rod 66 from rotative movement. Secured to the lower end of this rod is a resilient contact finger 74 which engages the contact ring 58 in all positions of the arm 40 excepting its vertical position in which case the finger is located at the gap 60. In order that the arm 40 may be held either in horizontal or vertical position, the stationary cup member 18 is provided with spring-pressed detents 76 which engage shallow depressions in the inner wall of the rotatable cup member 38.

Secured to the contact ring 58 is an insulated wire 78 which passes through the hollow shaft 20 and out through the support 10 to a battery B which has a switch S associated therewith. When this switch is closed, the circuit through the lamp for most positions of the indicating arm is completed since the lamp at one side of the switch is connected to the frame of the vehicle as indicated at G' in Fig. 8. The rear of the cup member 18 is closed by a cover plate 80 secured thereto and this plate is provided with a projection 82 having a concaved depression to receive a ball 84 held frictionally in place by a screw-threaded cap 86 which engages external threads on the projection. The ball 84 carries a frame 88 for holding a mirror 90 above which is a visor member 92 secured to the frame 88. The screw threaded cap 86 holds the ball 84 frictionally so that the mirror may be readily adjusted into different positions. The device as shown in Figs. 6 and 7 is substantially the same as that already described, the difference being that the support designated 10' instead of being provided with clips for securing it to a windshield post is provided wth a flattened portion 94 having holes to receive screws 96 for securing the support to the frame F which is outside of the windshield of a closed car.

The operation and advantages of our invention will be obvious from the foregoing description. The normal position of the arm 40 carrying the signal at its end is shown in full lines in Fig. 1 extending upwardly. When the arm is in this position, the lamp is not lit since the contact finger 74 is at the gap 60 of the contact ring 58 as shown in Fig. 5. When the driver wishes to stop, slow down or turn, the arm 40 may be moved by means of the handle 30 and the operating connections, previously described, into different positions as shown in dotted lines in Fig. 1. As soon as the contact finger 74 is moved into engagement with the contact ring 58, the lamp is lit. If the traffic regulations of the particular place require the signal to be displayed in downward position, the arm may be turned from upright position through 180° instead of through 90°. In fact, this arm may be turned all the way through a complete circle. It will thus be seen that our device is efficient for the purpose intended and is also economical in use since a small lamp at the outer end of the indicating arm serves to display a signal such as a red light signal at the rear and a differently colored signal at the front, and this lamp will not be lit when the signal arm extends upwardly in its normal inoperative position. By mounting the signal arm so that it may be rotated through a complete circle, it is adapted for use to meet different traffic regulations or ordinances. When the signal arm extends downwardly, the device is adapted for a parking light, since the lamp will be lit in this position. Regardless of whether the windshield support extends exactly in a vertical direction or in an inclined direction as is often the case, the device may be readily attached thereto so that the signal arm will extend vertically upward when the lamp is not lit, and so that the signal arm may be held in either horizontal or downwardly extending position with the lamp lit.

We claim:

A signal for motor vehicles comprising a support adapted to be secured to a windshield post of the vehicle, an outwardly extending sleeve secured to said support, a cup-shaped member secured to the outer end of said sleeve, a bearing formed in said cup-shaped member, a horizontal shaft rotatably mounted in said bearing, a second cup-shaped member secured to the outer end of said shaft, the periphery of said second cup-shaped member rotatably engaging the periphery of said first cup-shaped member, an indicating arm carried by said second cup-shaped member, a miter gear on the inner end of said shaft, a horizontal shaft rotatably mounted in said sleeve, a miter gear on the outer end of said last-mentioned shaft meshing with said first-mentioned miter gear, a miter gear on the inner end of said last-mentioned shaft, an operating shaft rotatably mounted in said support, a miter gear on the inner end of said operating shaft in mesh with said last-mentioned miter gear, and a handle on the outer end of said operating shaft.

In testimony whereof we hereunto affix our signatures.

EARL T. WINGET.
HARVEY E. BRADLEY.
MORLEY C. WALTER.